Feb. 28, 1967  V. I. JOHANNES  3,307,091
ELECTRONICALLY COMMUTATED DYNAMOELECTRIC MACHINE
Filed June 9, 1964  2 Sheets-Sheet 1
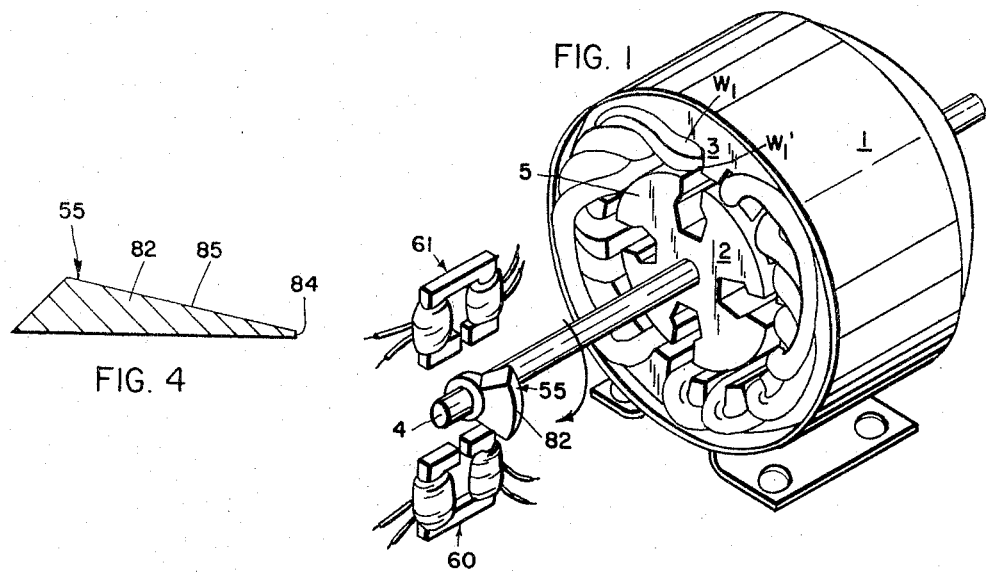
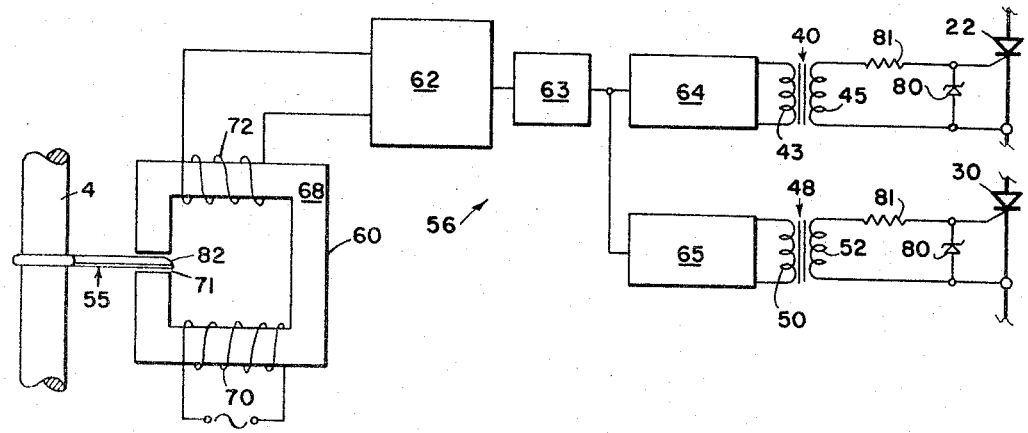
INVENTOR.
VIRGIL I. JOHANNES.
BY Frederick E. McMullen
ATTORNEY.

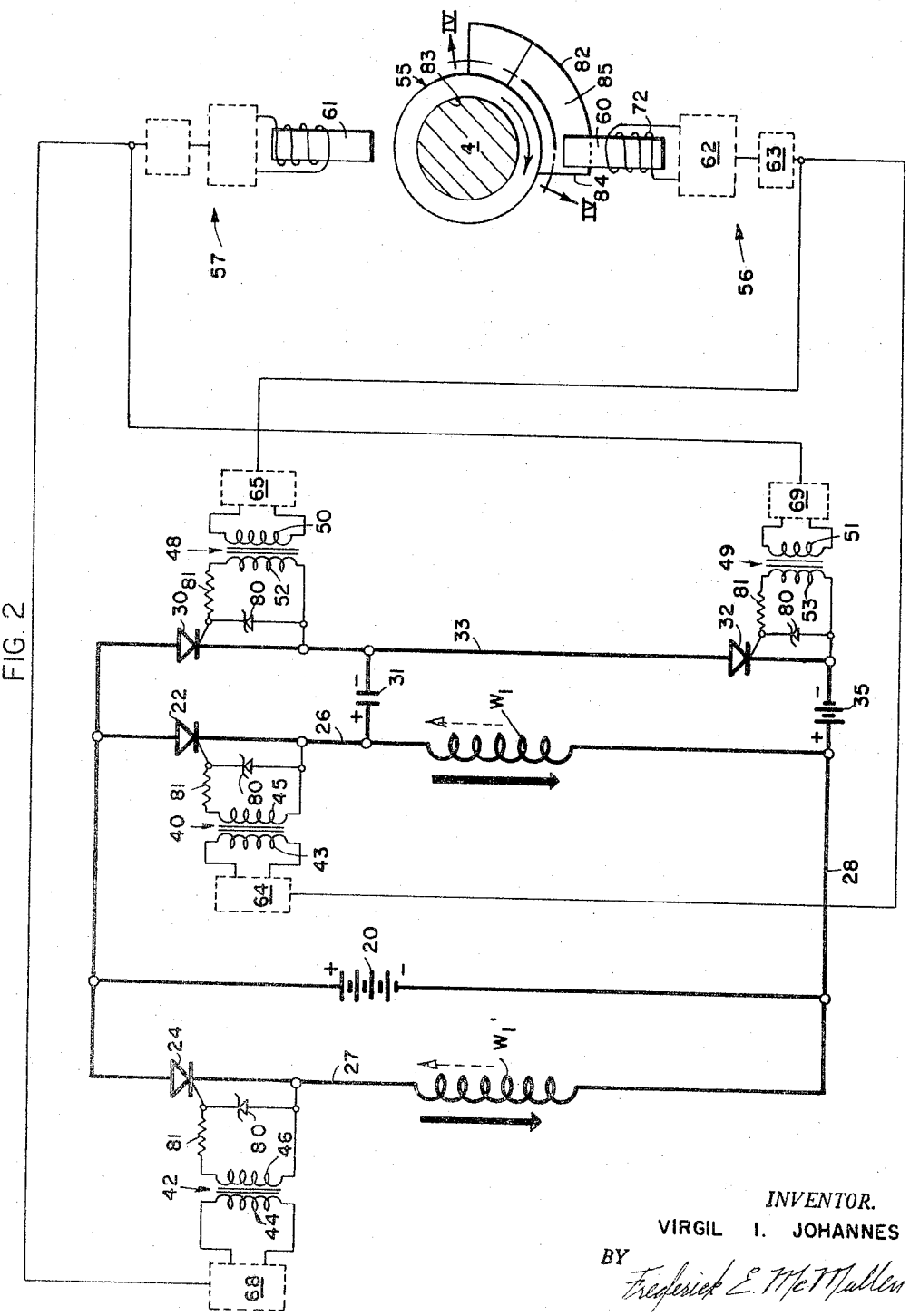

United States Patent Office 3,307,091
Patented Feb. 28, 1967

3,307,091
ELECTRONICALLY COMMUTATED DYNAMO-ELECTRIC MACHINE
Virgil I. Johannes, Plainfield, N.J., assignor to Carrier Corporation, Syracuse, N.Y., a corporation of Delaware
Filed June 9, 1964, Ser. No. 373,654
8 Claims. (Cl. 318—138)

This invention relates to dynamoelectric machines, and more particularly to a motor intended for operation on direct current.

In dynamoelectric machines, the magnetic field established by the rotating portion is held in predetermined operational relationship with the magnetic field established by the stationary portion. In the usual direct current motor, this predetermined operational relationship between the magnetic fields of the relatively movable rotor and stator is effected by continuously switching the energy input to the motor rotor. The usual method for performing the required switching operation is to employ a mechanical switching device, normally a pair of fixed brushes in contact with a rotating commutator.

The use of mechanical switching devices such as brush and commutator mechanisms to switch energy input to the motor restricts both motor capability and application. The aforementioned brush and commutator mechanism, which carries the full energy input to the motor, is subject to arcing. Since brushes and commutator are in frictional contact one with the other, their operational life is relatively short.

The use of motors with integral brush and commutator mechanism is limited to environments not deleterious to the mechanism. This limitation is exemplified by considering the use of direct current motors in refrigeration systems. Where the motor is combined with the refrigerant compressor to form a hermetic unit exposed to the refrigerant atmosphere, the use of a direct current motor having integral brush and commutator mechanism is prohibited.

The principal object of the present invention is to provide a novel operating arrangement for dynamoelectric machines.

It is a further object of the present invention to provide a new and improved direct current motor suitable for use in refrigerant atmospheres.

It is an additional object of the present invention to provide a new and improved low power electronic operating arrangement for a direct current motor.

It is an object of the present invention to provide an electronic switching control for a direct current motor employing solid state switching devices and having minimal power loss.

The invention relates to a motor comprising in combination a rotor, at least one pair of energizing windings inductively coupled one to the other, first means for energizing one of the windings, and means for deenergizing the one winding including means dischargeable through the other winding.

The invention further relates to a motor comprising in combination a pair of energizing windings inductively coupled one to the other, a rotor movable in response to energization of the windings, a first solid state switching device adapted when rendered operative to connect one of the windings with a source of electrical energy, a second solid state switching device, a capacitor connected between the second switching device and the junction of the first switching device and the one winding, the second switching device being adapted when rendered operative to discharge the capacitor through the one winding to reduce current flow through the first switching device to render the first switching device inoperative and deenergize the one winding, a third solid state switching device adapted when rendered operative to connect the other winding with the source of electrical energy, a fourth solid state switching device connected to the junction of said capacitor and the second switching device, the fourth switching device being adapted when rendered operative to discharge the capacitor through the one winding to reduce curent flow through the third switching device to render the third switching device inoperative and deenergize the other winding.

Other objects will be apparent from the ensuing description and drawings in which:

FIGURE 1 is a view of a motor employing applicant's novel operating arrangement;
FIGURE 2 is a circuit diagram showing the operating arrangement according to this invention;
FIGURE 3 is a block diagram of the control means for the operating arrangement shown in FIGURE 2; and
FIGURE 4 is an enlarged cross sectional view of the position sensor taken along lines IV—IV of FIGURE 2.

Referring to FIGURE 1 of the drawings, there is shown a motor 1 having a relatively rotatable rotor 2 and stator 3 inductively connected one to the other. Preferably, rotor 2 comprises a permanently magnetized member 5 having north-south poles with output shaft 4. Stator 3 is provided with one or more pairs of windings $W_1$, $W_1'$; $W_n$, $W_n'$ suitably wound thereon so that each of the windings $W_1$, $W_n$ is inductively coupled with winding $W_1'$, $W_n'$ respectively as by positioning the turns of windings $W_1$, $W_n$ in the same slot as the turns of windings $W_1'$, $W_n'$ respectively. Various stator winding arrangements such as waves may be contemplated.

Windings $W_1$, $W_1'$; $W_n$, $W_n'$, upon flow of current therethrough, establish north-south magnetic poles. It is understood that a reversal in the direction of current flow through windings $W_1$, $W_1'$; $W_n$, $W_n'$ renders the magnetic poles south-north.

Referring to FIGURE 2 of the drawings, applicant's operating arrangement for energizing windings $W_1$, $W_1'$ of motor 1 to effect rotation of rotor 2 is therein shown. It is understood that energization of remaining pairs of motor windings $W_n$, $W_n'$ is similarly controlled.

A suitable source of primary direct current energy, for example, battery 20, is provided. Suitable switching devices 22, 24 are series connected with windings $W_1$, $W_1'$ respectively across the positive and negative sides of battery 20. Series connected switching devices 30, 32 are connected in parallel with switching device 22 and its associated winding $W_1$ across the positive and negative sides of battery 20. Switching devices 30, 32 may in the alternative be connected in parallel with switching devices 24 and winding $W_1'$. Switching devices 22, 24, 30, 32 are preferably solid state or semiconductor type switching devices and preferably silicon-controlled rectifiers. Other suitable semiconductor switching devices such as transistors may be contemplated.

The input electrodes of silicon-controlled rectifiers 22, 24 are connected to the positive terminal of battery 20 and output electrodes thereof are connected to windings $W_1$, $W_1'$ by lines 26, 27 respectively. Windings $W_1$, $W_1'$ are connected to the negative terminal of battery 20 by means of a common return or ground line 28.

Silicon-controlled rectifier 22, when rendered operative, completes a circuit from the positive terminal of battery 20 through winding $W_1$ and ground line 28 to the negative terminal of battery 20. Similarly, silicon-controlled rectifier 24, when rendered operative, completes a circuit from the positive terminal of battery 20 through winding $W_1'$ and line 28 to the negative terminal of battery 20. Current flow in windings $W_1$, $W_1'$ is in the direction shown by the solid line arrows.

The input electrode of silicon-controlled rectifier 30 is connected to the positive terminal of battery 20 while the output electrode thereof is connected by line 33 to the input electrode of silicon-controlled rectifier 32. A line 34 connects the output electrode of silicon-controlled rectifier 32 to the negative side of a suitable source of secondary direct current energy, for example, control battery 35. A suitable capacitor 31 is connected between line 26 and line 33.

Control transformers 40, 42 having secondary windings 45, 46 respectively connected across the control electrode and output electrode of silicon-controlled rectifiers 22, 24 respectively are provided. Primary windings 43, 44 of transformers 40, 42 are connected to trigger circuits 64, 68 of pickup devices 56, 57 respectively.

Control transformers 48, 49 having secondary windings 52, 53 respectively connected across the control electrode and output electrode of silicon-controlled rectifiers 30, 32 respectively are provided. Primary windings 50, 51 of control transformers 48, 49 are connected to trigger circuits 65, 69 of pickup devices 56, 57 respectively.

A sensor 55 adapted to be secured to motor shaft 4 for rotation therewith is provided. Sensor 55 comprises a generally cylindrical element having extending part 82 of predetermined arcuate extent and uniform radial dimension. Sensor 55 includes an opening 83 for receiving the motor shaft 4. Suitable fastening means (not shown) are provided for fixedly attaching sensor 55 to motor shaft 4. Referring to FIGURE 4 of the drawings, part 82 of sensor 55 is generally triangular in cross section. The inclined or sloping forward surface 85 thereof terminates in leading edge 84.

Sensor 55 is positioned relative to variable coupling transformers 60, 61 of pickup devices 56, 57 so that part 82 of sensor 55 passes through the air gap of transformers 60, 61 during each revolution of motor shaft 4. It is understood that the duration during which part 82 of sensor 55 is within the transformer air gap may be controlled by varying the arcuate extent of sensor part 82. Additionally, the rate in which the size of the air gap of transformers 60, 61 is varied by sensor 55 is dependent upon the speed at which shaft 4 rotates and the slope of the forward surface 85 of sensor part 82.

Referring to FIGURE 3 of the drawings, pickup device 56 comprises variable coupling transformer 60, amplifier 62, detector 63 and trigger circuits 64, 65 connected to primary windings 43, 50 of control transformers 40, 48 respectively. Pickup device 57 is similarly constructed, trigger circuits 68, 69 thereof being connected to primary windings 44, 51 of control transformers 42, 49 respectively. Transformers 60, 61 of pickup devices 56, 57 are disposed in predetermined angular relation relative to one another about the circumference of motor shaft 4.

Variable coupling transformer 60 of pickup device 56 comprises a generally C-shaped core 68 formed from a suitable ferromagnetic substance having primary and secondary coils 70, 72 thereon. Transformer core 68 is interrupted at 71 to define a space or air gap of predetermined size. Transformer 60 is disposed proximate motor shaft 4 so that part 82 of sensor 55 passes through air gap 71 once during each revolution of motor shaft 4.

Primary coil 70 of variable coupling transformer 60 is connected across a suitable source of alternating power. Through transformer action, an alternating signal is induced in secondary coil 72. It is understood that transformer coupling varies with the effective size of transformer air gap 71. Where part 82 of sensor 55 is without air gap 71, the signal induced in secondary coil 72 differs from the signal induced in secondary coil 72 when sensor part 82 is within the air gap 71. The rate of change in the signal induced in secondary transformer coil 72 is dependent upon the rate by which sensor part 82 changes the effective size of air gap 71.

Secondary coil 72 of variable coupling transformer 60 is connected to detector 63, preferably through an amplifier 62. Amplifier 62, preferably a single stage amplifier of any commercially available type, magnifies the alternating signal induced in transformer secondary coil 72. Detector 63 rectifies the alternating signal to provide a unidirectional signal, the intensity of which varies with the effective size of transformer air gap 71. Detector 63 may be any suitable commercially available detector.

Trigger circuits 64, 65, comprising any suitable circuit arrangement for producing a determined current in response to a predetermined signal, are connected between detector 63 and windings 43, 50 of control transformers 40, 48 respectively. Trigger circuits 64, 65, when actuated, pass current through primary windings 43, 50 of control transformers 40, 48 respectively.

A unidirectional current control device, for example, a Zener or breakdown diode 80, is preferably connected across each of the secondary windings 45, 46, 52, 53 respectively of control transformers 40, 42, 48, 49. Resistor 81 may be connected between each of the transformer secondary windings 45, 46, 52, 53 and diode 80. Diodes 80, at a determined voltage, provide a path of current flow to limit the voltage applied to the control electrodes of silicon-controlled rectifiers 22, 24, 30, 32. Additionally, diodes 80 provide a path for current flow following interruption of the circuit to primary windings 43, 44, 50, 51 in a manner to be explained hereinafter. Resistors 81 are suitably sized to regulate current in the control electrode circuit of silicon-controlled rectifiers 22, 24, 30, 32 respectively.

Rotation of motor output shaft 4 is in a clockwise direction as shown by the arrows in FIGURES 1 and 2 of the drawings. As the leading edge 84 of sensor part 82 enters air gap 71 of variable coupling transformer 60, the signal induced in secondary transformer windings 72 changes. The input signal at trigger circuits 64, 65 of pickup device 56 similarly changes.

With sensor 55 in the position shown in FIGURE 2 of the drawings, a first predetermined signal is induced in transformer secondary coil 72. Trigger circuit 64 is actuated to pass a current through primary winding 43 of control transformer 40. The build-up of current in primary winding 43 of transformer 40 results, through transformer action, in a pulse of current through secondary winding 45 of transformer 40 in the control electrode circuit of silicon-controlled rectifier 22. The flow of current in the control electrode circuit of silicon-controlled rectifier 22 places a positive potential on the control electrode thereof to render rectifier 22 operative. Silicon-controlled rectifier 22 completes a circuit from battery 20 through rectifier 22 to common return line 28 to energize winding $W_1$. Current flow in winding $W_1$ is in the direction shown by the solid line arrow in FIGURE 2 of the drawings.

As motor shaft 4 and sensor 55 fixedly secured thereto rotate, the gradually increasing thickness of part 82 of sensor 55 as defined by the slope of forward surface 85 reduces the effective size of transformer air gap 71 with a corresponding change in the signal induced in transformer secondary coil 72. At a predetermined second input signal, trigger circuit 65 of pickup device 56 is actuated to pass a current through primary winding 50 of control transformer 48.

The build-up of current in primary winding 50 induces, by transformer action, a corresponding pulse of current through secondary winding 52 of transformer 48 in the control electrode circuit of silicon-controlled rectifier 30 to place a positive potential on the control electrode of rectifier 30 to render rectifier 30 operative and discharge capacitor 31 through winding $W_1$.

The polarity of capacitor 31 when winding $W_1$ is energized is shown in FIGURE 2 of the drawings. The manner by which capacitor 31 is charged to that polarity will be apparent from the ensuing description. Discharge of capacitor 31 through windings $W_1$ reduces current flow through silicon-controlled rectifier 22 to render rectifier 22 inoperative and interrupt the circuit from battery 20 through rectifier 22 to winding $W_1$.

Capacitor 31, connected across the positive and negative terminals of battery 20 through winding $W_1$ and silicon-controlled rectifier 30, recharges in a polarity opposite that shown in FIGURE 2 of the drawings. As capacitor 31 recharges, the flow of current through silicon-controlled rectifier 30 is reduced and rectifier 30 becomes inoperative, interrupting the circuit between winding $W_1$ and battery 20.

Continued rotation of motor shaft 4 in a clockwise direction brings leading edge 84 of sensor part 82 into the air gap of variable coupling transformer 61 of pickup device 57. As described heretofore, the change in the transformer air gap size due to the movement of sensor part 82 therethrough changes the signal induced in the secondary winding of transformer 61. At a first predetermined signal, trigger circuit 68 of pickup device 57 is actuated to pass a current through primary winding 44 of control transformer 42. The build-up of current in primary winding 44 to control transformer 42 results through transformer action in a pulse of current through the transformer secondary winding 46 in the control electrode circuit of silicon-controlled rectifier 24 to place a positive potential on the control electrode thereof and render rectifier 24 operative. Silicon-controlled rectifier 24 completes a circuit from battery 20 through rectifier 24 to common return line 28 to energize winding $W_1'$. Current flow through winding $W_1'$ is in the direction shown by the solid line arrow in FIGURE 2 of the drawings.

As part 82 of sensor 55 moves through the air gap of transformer 61, a second predetermined signal actuates trigger circuit 69 of pickup device 57 to pass a current through primary winding 51 of control transformer 49. The build-up of current in primary winding 51 induces by transformer action a pulse of current through the secondary winding 53 of transformer 49 in the control electrode circuit of silicon-controlled rectifier 32 to place a positive potential on the control electrode thereof to render rectifier 32 operative and discharge capacitor 31 through winding $W_1$. The resulting flow of current in winding $W_1$ in the direction indicated by the dotted line arrow in FIGURE 2 of the drawings induces, by transformer action, a corresponding flow of current through winding $W_1'$ inductively coupled thereto. Flow of induced current through winding $W_1'$ in the direction indicated by the dotted line arrow in FIGURE 2 of the drawings reduces current flow through silicon-controlled rectifier 24 to render rectifier 24 inoperative to deenergize winding $W_1'$.

Capacitor 31, connected across the positive and negative terminals of control battery 35 through winding $W_1$ by silicon-controlled rectifier 32, recharges in the polarity shown in FIGURE 2 of the drawings. As capacitor 31 recharges the flow of current through silicon-controlled rectifier 32 is reduced and rectifier 32 becomes inoperative, interrupting the circuit between winding $W_1$ and control battery 35.

It is understood that energization of each pair of motor windings $W_n$, $W_n'$ is similarly controlled. Where added pairs of motor windings $W_n$, $W_n'$ are provided, the variable coupling transformers of the respective pickup devices for each added windings are disposed in operative relation with sensor 55 in predetermined angular relationship with each other and coupling transformers 60, 61 of pickup devices 56, 57. It is understood that each pickup device may control energization and deenergization of more than one winding.

By applicant's novel operating arrangement for dynamoelectric machines, use of mechanical commutating means, such as contacting brushes and commutator, is obviated.

While I have described a preferred embodiment of my invention, it will be understood that my invention is not limited thereto since it may be otherwise embodied within the scope of the following claims.

I claim:
1. In a motor having a pair of energizing windings inductively coupled one to the other and a rotor movable in response to energization of said windings, the combination of a first solid state switching device adapted when rendered operative to connect one of said windings with a source of electrical energy, a second solid state switching device, a capacitor connected between said second switching device and the junction of said first switching device and said one winding, said second switching device being adapted when rendered operative to discharge said capacitor through said one winding to reduce current flow through said first switching device to render said first switching device inoperative and deenergize said one winding, a third solid state switching device adapted when rendered operative to connect the other winding with said source of electrical energy, and a fourth solid state switching device connected to the junction of said capacitor and said second switching device, said fourth switching device being adapted when rendered operative to discharge said capacitor through said one winding to reduce current flow through said third switching device to render said third switching device inoperative and deenergize said other winding.

2. In a motor having a rotor with a first energizing winding inductively coupled to a second energizing winding, the combination of first and second solid state switching devices adapted when rendered operable to connect said first and second windings respectively to a source of electrical energy, means for sensing rotor position adapted to render said first switching device operable at a determined first rotor position and to render said second switching device operable at a determined second rotor position, means for rendering said first and second switching devices inoperable including third and fourth solid state switching devices series connected one to the other, said rotor position sensing means being adapted to render said third and fourth switching devices operable in response to predetermined movement of said rotor from said first and second rotor positions respectively, a capacitor connected between the junction of said first winding and said first switching device and said third and fourth switching devices, operation of said third switching device being adapted to discharge said capacitor through said first winding to apply a reverse potential across said first switching device to deenergize said first winding, operation of said fourth switching device being adapted to discharge said capacitor across said first winding to apply a reverse potential across said second switching device to deenergize said second winding.

3. In a motor having a rotor and at least one pair of first and second energizing windings, said first winding being inductively coupled with said second winding, the combination of a first turn-on solid state switching device adapted when rendered operative to energize said first winding, and means for reducing current flow through said first turn-on switching device to render said first turn-on switching device inoperative and deenergize said first winding, said current reducing means including a capacitor adapted when discharged to pass a pulse of current through said second winding, and a first turn-off solid state switching device adapted when rendered operative to discharge said capacitor through said second winding, the inductive coupling between said first and second windings causing a corresponding pulse of current to be induced in said first winding reducing the flow of current through said first turn-on switching device to render said first turn-on switching device inoperative and deenergize said first winding.

4. In a motor according to claim 3, a second turn-on solid state switching device adapted when rendered operative to energize said second winding, said current reducing means including a second turn-off solid state switching device adapted when rendered operative to discharge said capacitor through said second winding, the pulse of current passed through said second winding upon discharge of said capacitor reducing the flow of current through said second turn-on switching device to render said second turn-on switching device inoperative and deenergize said second winding.

5. In a motor according to claim 4, said first and second turn-off switching devices being series connected with one another across said second turn-on switching device and said second winding, said capacitor being electrically connected between the junction of said second turn-on switching device and said second winding and the junction of said first turn-off switching device with said second turn-off switching device.

6. In a motor having a rotor and at least one pair of energizing windings inductively coupled one to the other, the combination of means for energizing each of said windings in a predetermined order to effect rotation of said rotor, said energizing means including at least one solid state switching device associated with each of said windings, and deenergizing means adapted to pass a current through one of said windings to reduce the flow of current through said solid state switching devices to render said switching devices inoperative and deenergize said windings, said deenergizing means including at least one capacitor adapted to be electrically connected to said one winding, and first and second series connected solid state switching devices, said capacitor being connected at the junction of said first and second solid state switching devices, said first solid state switching device being adapted when rendered operative to discharge said capacitor through said one winding to reduce current flow through the solid state switching device associated with said one winding to render said last-mentioned switching device inoperative and deenergize said one winding, said second solid state switching device being adapted when rendered operative to discharge said capacitor through said one winding to reduce current flow through the solid state switching device associated with said other winding to render said last-mentioned solid state switching device inoperative and deenergize said other winding.

7. A motor according to claim 6 including control means responsive to movement of said motor rotor for rendering said first solid state switching device operative in response to predetermined movement of said motor rotor following energization of said one winding, said control means rendering said second solid state switching device operative in response to said predetermined motor rotor movement following energization of said other winding.

8. In a motor having a rotor and at least one pair of energizing windings inductively coupled one to the other, the combination of means for energizing each of said windings in a predetermined order to effect rotation of said rotor, said means including at least one solid state switching device associated with each of said windings, and means for deenergizing each of said windings including capacitance means dischargeable through one of said windings, said deenergizing means including at least one pair of series connected solid state switching devices, said capacitance means being connected between the junction of said pair of switching devices and the junction of one of said windings and its associated switching device.

References Cited by the Examiner
UNITED STATES PATENTS

| | | | |
|---|---|---|---|
| 3,120,620 | 2/1964 | Nowell | 307—88.5 |
| 3,132,294 | 5/1964 | Foote | 313—138 |
| 3,156,858 | 11/1964 | Reitherman | 313—138 |
| 3,184,665 | 5/1965 | Wright | 307—88.5 |
| 3,225,277 | 12/1965 | Foulger | 131—138 |
| 3,229,179 | 1/1966 | Hetzel | 313—138 |

ORIS L. RADER, *Primary Examiner.*

G. SIMMONS, *Assistant Examiner.*